United States Patent
Sautto et al.

(10) Patent No.: US 12,206,253 B2
(45) Date of Patent: Jan. 21, 2025

(54) VOLTAGE DOUBLER IN WIRELESS POWER APPLICATION

(71) Applicant: Renesas Electronics America Inc., Milpitas, CA (US)

(72) Inventors: Marco Sautto, Zurich (CH); Sercan Ipek, Zurich (CH); Turev Acar, Foster City, CA (US)

(73) Assignee: Renesas Electronics America Inc., Milpitas, CA (US)

( * ) Notice: Subject to any disclaimer, the term of this patent is extended or adjusted under 35 U.S.C. 154(b) by 285 days.

(21) Appl. No.: 17/896,495

(22) Filed: Aug. 26, 2022

(65) Prior Publication Data

US 2024/0072683 A1    Feb. 29, 2024

(51) Int. Cl.
*H02J 50/12* (2016.01)
*H02M 7/219* (2006.01)
*H02M 7/25* (2006.01)

(52) U.S. Cl.
CPC ............. *H02J 50/12* (2016.02); *H02M 7/219* (2013.01); *H02M 7/25* (2013.01)

(58) Field of Classification Search
CPC .......... H02J 50/12; H02M 7/219; H02M 7/25; H02M 7/1623; H02M 7/1626; H02M 1/0058
See application file for complete search history.

(56) References Cited

U.S. PATENT DOCUMENTS

| | | | | |
|---|---|---|---|---|
| 11,193,301 B2* | 12/2021 | Nam | ............... | E04H 15/405 |
| 11,336,202 B1* | 5/2022 | Sautto | ............... | H02M 1/32 |
| 2014/0347007 A1* | 11/2014 | Kee | ............... | H02J 50/90 |
| | | | | 320/108 |
| 2017/0256956 A1* | 9/2017 | Irish | ............... | H02M 7/217 |
| 2019/0013728 A1* | 1/2019 | Liu | ............... | H02J 50/12 |
| 2023/0216425 A1* | 7/2023 | Yang | ............... | H02M 1/0003 |
| | | | | 363/89 |
| 2023/0253893 A1* | 8/2023 | Smith | ............... | H02M 1/083 |
| | | | | 307/104 |
| 2024/0039274 A1* | 2/2024 | Hou | ............... | H02J 50/10 |

* cited by examiner

*Primary Examiner* — Alex Torres-Rivera
(74) *Attorney, Agent, or Firm* — SCULLY, SCOTT, MURPHY & PRESSER, P.C.

(57) ABSTRACT

Systems and methods for wireless power transfer systems are described. A controller can be coupled to a power rectifier configured to rectify alternating current power into direct current power. The power rectifier can include a first high side transistor, a second high side transistor, a first low side transistor, and a second low side transistor. The controller can be configured to selectively switch on one or more of the first high side transistor, the second high side transistor, the first low side transistor, and the second low side transistor to operate a wireless power receiver under one of a full bridge rectifier mode and a voltage doubler mode.

20 Claims, 13 Drawing Sheets

VOLTAGE DOUBLER IN WIRELESS POWER APPLICATION

BACKGROUND

The present disclosure relates in general to apparatuses and methods for operating wireless power receivers under different modes to reduce power dissipation and improve efficiency. Particularly, the different modes include a full bridge rectifier mode and a voltage doubler mode.

Wireless power systems can include a transmitter having a transmission coil and a receiver having a receiver coil. In an aspect, the transmitter may be connected to a structure including a wireless charging region. In response to a device including the receiver being placed on the charging region, or in proximity to the charging region, the transmission coil and the receiver coil can be inductively coupled with one another to form a transformer that can facilitate inductive transfer of alternating current (AC) power. The transfer of AC power, from the transmitter to the receiver, can facilitate charging of a battery of the device including the receiver.

SUMMARY

In one embodiment, a semiconductor device for wireless power receiver is generally described. The semiconductor device can include a power rectifier and a controller coupled to the power rectifier. The power rectifier can be configured to rectify alternating current (AC) power into direct current (DC) power. The power rectifier can include a first high side transistor, a second high side transistor, a first low side transistor, and a second low side transistor. The controller can be configured to selectively switch on one or more of the first high side transistor, the second high side transistor, the first low side transistor, and the second low side transistor to operate a wireless power receiver under one of a full bridge rectifier mode and a voltage doubler mode.

In one embodiment, an apparatus for operating a wireless power receiver is generally described. The apparatus can include a plurality of comparators and a controller coupled to the plurality of comparators. The plurality of comparators can be configured to measure voltage levels across a first high side transistor, a second high side transistor, a first low side transistor, and a second low side transistor of a power rectifier. The plurality of comparators can be further configured to output a plurality of signals. The controller can be configured to, based on the plurality of signals outputted by the plurality of comparators, selectively switch on one or more of the first high side transistor, the second high side transistor, the first low side transistor, and the second low side transistor to operate a wireless power receiver under one of a full bridge rectifier mode and a voltage doubler mode.

In one embodiment, a method for operating a wireless power receiver is generally described. The method can include receiving, by an integrated circuit, a plurality of signals from a plurality of comparators, wherein the plurality of signals is based on measurements of voltage levels across a first high side transistor, a second high side transistor, a first low side transistor, and a second low side transistor of a power rectifier. The method can further include, based on the plurality of signals, selectively switching, by the controller, one or more of the first high side transistor, the second high side transistor, the first low side transistor, and the second low side transistor to operate a wireless power receiver under one of a full bridge rectifier mode and a voltage doubler mode.

Further features as well as the structure and operation of various embodiments are described in detail below with reference to the accompanying drawings. In the drawings, like reference numbers indicate identical or functionally similar elements.

DETAILED DESCRIPTION

In the following description, numerous specific details are set forth, such as particular structures, components, materials, dimensions, processing steps and techniques, in order to provide an understanding of the various embodiments of the present application. However, it will be appreciated by one of ordinary skill in the art that the various embodiments of the present application may be practiced without these specific details. In other instances, well-known structures or processing steps have not been described in detail in order to avoid obscuring the present application.

Figure 1:
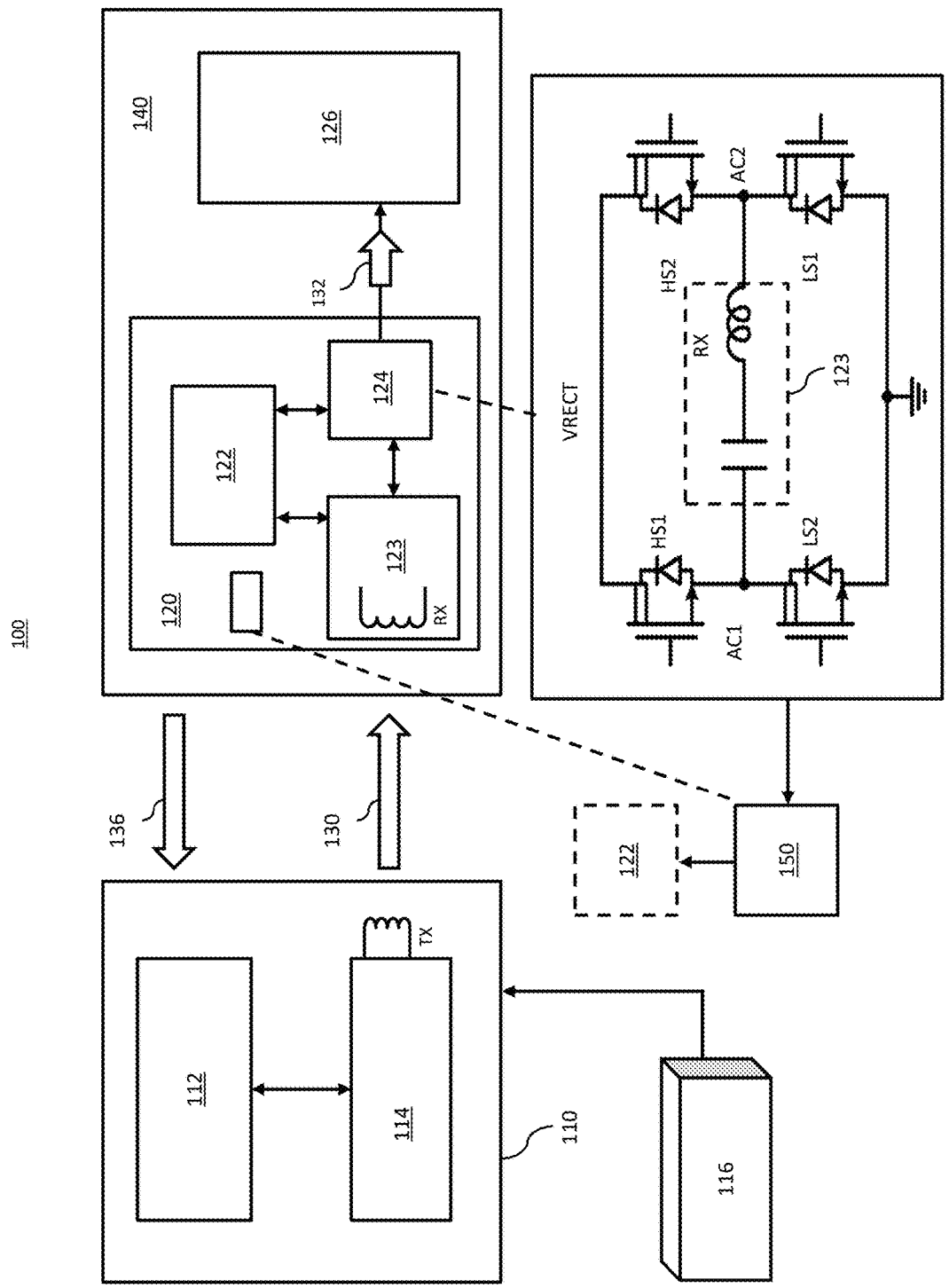
FIG. 1 is a diagram showing an example system that can implement full bridge rectifier and voltage doubler in wireless power application in one embodiment.

FIG. 1 is a diagram showing an example system that can implement full bridge rectifier and voltage doubler in wireless power application in one embodiment. System 100 can include power devices, such as a transmitter 110 and a receiver 120, that are configured to wirelessly transfer power and data therebetween via inductive coupling. While described herein as transmitter 110 and receiver 120, each of transmitter 110 and receiver 120 may be configured to both transmit and receive power or data therebetween via inductive coupling. Transmitter 110 can be referred to as a wireless power transmitter and receiver 120 can be referred to as a wireless power receiver.

Transmitter 110 is configured to receive power from one or more power supplies and to transmit AC power 130 to receiver 120 wirelessly. For example, transmitter 110 may be configured for connection to a power supply 116 such as, e.g., an adapter or a DC power supply. Transmitter 110 can be a semiconductor device including a controller 112 and a power driver 114.

Controller 112 can be configured to control and operate power driver 114. Controller 112 can include, for example, a processor, central processing unit (CPU), field-programmable gate array (FPGA) or any other circuitry that is configured to control and operate power driver 114. While described as a CPU in illustrative embodiments, controller 112 is not limited to a CPU in these embodiments and may comprise any other circuitry that is configured to control and operate power driver 114. In an example embodiment, controller 112 can be configured to control power driver 114 to drive a coil TX of the power driver 114 to produce a magnetic field. Power driver 114 can be configured to drive coil TX at a range of frequencies and configurations defined by wireless power standards, such as, e.g., the Wireless Power Consortium (Qi) standard, the Power Matters Alliance (PMA) standard, the Alliance for Wireless Power (A for WP, or Rezence) standard or any other wireless power standards.

Receiver 120 can be configured to receive AC power 130 transmitted from transmitter 110 and to supply the power to one or more loads 126 or other components of a destination device 140. Load 126 may comprise, for example, a battery charger that is configured to charge a battery of the destination device 140, a DC-DC converter that is configured to supply power to a processor, a display, or other electronic components of the destination device 140, or any other load of the destination device 140. Destination device 140 may comprise, for example, a computing device, mobile device, mobile telephone, smart device, tablet, wearable device or any other electronic device that is configured to receive power wirelessly. In an illustrative embodiment, destination device 140 can include receiver 120. In other embodiments, receiver 120 may be separate from destination device 140 and connected to destination device 140 via a wire or other component that is configured to provide power to destination device 140.

Receiver 120 can be a semiconductor device including a controller 122, a resonant circuit 123, and a power rectifier 124. Controller 122 can be an integrated circuit including, for example, a digital controller such as a microcontroller, a processor, CPU, FPGA or any other circuitry that may be configured to control and operate power rectifier 124. Resonant circuit 123 can include a coil RX and one or more capacitors, inductors, resistors, that can form circuitry for outputting communication packets 136 and conveying AC power 130, received from transmitter 110, to power rectifier 124. Power rectifier 124 can include rectifier circuits such as half-bridge rectifiers, full bridge rectifiers, or other types of rectifier circuits that can be configured to rectify power received via resonant coil RX of resonant circuit 123 into a power type as needed for load 126. Power rectifier 124 is configured to rectify AC power 130 into DC power 132 which may then be supplied to load 126. Controller 122 can be configured to execute application specific programs and/or firmware to control and operate various components, such as resonant circuit 123 and power rectifier 124, of receiver 120.

As an example, when receiver 120 is placed in proximity to transmitter 110, the magnetic field produced by coil TX of power driver 114 induces a current in coil RX of resonant circuit 123. The induced current causes AC power 130 to be inductively transmitted from power driver 114 to power rectifier 124, via resonant circuit 123. Power rectifier 124 receives AC power 130 and converts AC power 130 into DC power 132. DC power 132 is then provided by power rectifier 124 to load 126.

Transmitter 110 and receiver 120 are also configured to exchange information or data, e.g., messages, via the inductive coupling of power driver 114 and resonant circuit 123. For example, before transmitter 110 begins transferring power to receiver 120, a power contract may be agreed upon and created between receiver 120 and transmitter 110. For example, receiver 120 may send communication packets 136 or other data to transmitter 110 that indicate power transfer information such as, e.g., an amount of power to be transferred to receiver 120, commands to increase, decrease, or maintain a power level of AC power 130, commands to stop a power transfer, or other power transfer information. In another example, in response to receiver 120 being brought in proximity to transmitter 110, e.g., close enough such that a transformer may be formed by coil TX and coil RX to allow power transfer, receiver 120 may be configured to initiate communication by sending a signal to transmitter 110 that requests a power transfer. In such a case, transmitter 110 may respond to the request by receiver 120 by establishing the power contract or beginning power transfer to receiver 120, e.g., if the power contract is already in place. Transmitter 110 and receiver 120 may transmit and receive communication packets 136, data or other information via the inductive coupling of coil TX and coil RX. In some embodiments, communication between transmitter 110 and receiver 120 can occur before power transfer stage using various protocols such as near field communication (NFC), Bluetooth, etc.

Details of power rectifier 124 is shown in FIG. 1. In an example, in response to receiving AC power 130, power rectifier 124 can rectify AC power 130 into DC voltage in order to supply DC power 132 to load 126. AC power 130 can be received through the AC1 and AC2 nodes of power rectifier 124. Four transistors HS1, HS2, LS1, LS2, which can be metal-oxide-semiconductor field-effect transistors (MOSFETs), can form a rectifier circuit that enable supplying the rectifier voltage (VRECT) to rectify the AC power 130.

The power transfer efficiency of system 100, such as the ratio of the output power delivered to 126 and the input power provided by 116, can be limited by the resistance of the coil RX. A number of wire or windings turns of the coil RX can be reduced to reduce the receiver coil resistance, but the voltage being induced on the coil RX would also diminish, hence reducing VRECT. VRECT has to reach a minimum voltage in order to power up the system 100, and this minimum voltage can be in the order of 3 to 5 volts (V).

The systems and methods described herein can allow receiver 120 to operate under different modes to address these challenges caused by implementation of low resistance receiver coils. The modes that can be switched by controller 122 can include a full bridge rectifier (FBR) mode and a voltage doubler (VD) mode. A circuit 150 can be integrated, between power rectifier 124 and controller 122. Circuit 150 can include a plurality of comparators configured to detect current and/or voltage events at power rectifier 124. For example, circuit 150 can detect voltages at different parts of power rectifier 124 (e.g., across transistors HS1, HS2, LS1, LS2, nodes AC1, AC2, and/or other nodes) and, in response to specific values of the detected current and/or voltages, notify controller 122 to selectively switch the transistors HS1, HS2, LS1, LS2 on or off to operate receiver 120 under different modes.

Figure 2:
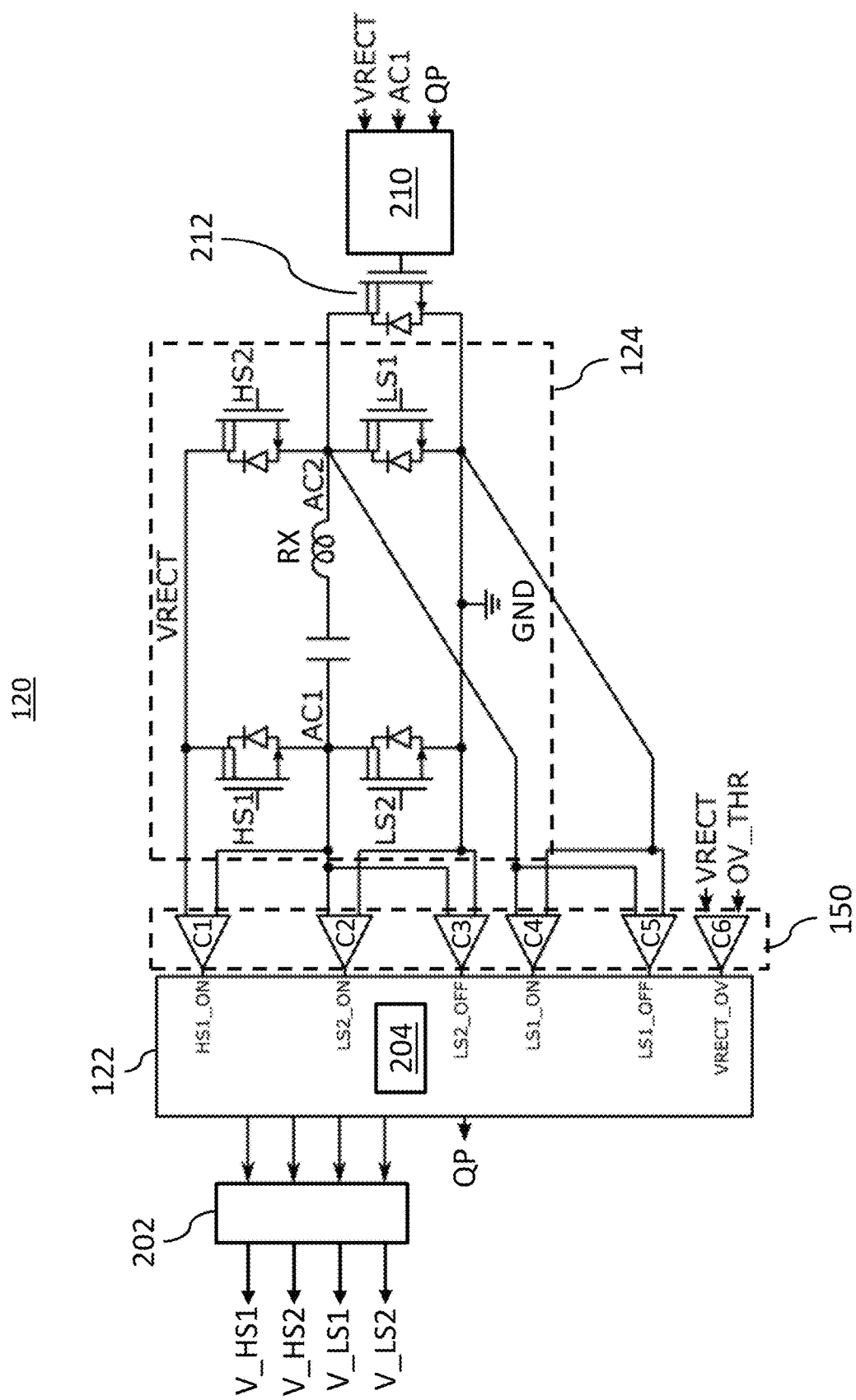
FIG. 2 is a diagram showing a circuit that can implement full bridge rectifier and voltage doubler in wireless power application in one embodiment.

FIG. 2 is a diagram showing a circuit that can implement full bridge rectifier and voltage doubler in wireless power application in one embodiment. In an example shown in FIG. 2, circuit 150 can include a plurality of comparators C1, C2, C3, C4, C5, C6. Outputs from comparators C1, C2, C3, C4, C5 can be inputs to a finite state machine 204 being implemented by controller 122. States and transition conditions of finite state machine 204 can be stored in a memory of controller 122. In one embodiment, comparators C1, C2, C3, C4, C5, C6 in circuit 150 can be Schmitt triggers.

Comparator C1 can receive a voltage level measured across transistor HS1 as inputs, and output a signal HS1_ON. In one embodiment, signal HS1_ON can have a voltage level representing a binary value (e.g., logic HIGH or LOW, or binary one or zero). Controller 122 can be configured to input HS1_ON into finite state machine 204 and finite state machine 204 can output a state based on the voltage level of signal HS1_ON. Controller 122, based on the state outputted by finite state machine 204 and based on a current state of transistors HS1, HS2, LS1, LS2, can determine which transistors among HS1, HS2, LS1, LS2 to selectively switch on, switch off, and maintain a current on or off state. In one embodiment, controller 122 can be configured to use signal HS1_ON under the VD mode. Controller 122 can be connected to input terminals of a gate driver 202. Output terminals of gate driver 202 can be connected to gate terminals of transistors HS1, HS2, LS1, LS2. In response to determining to switch on transistor HS1, controller 122 can send a drive voltage V_HS1 to gate driver 202 and gate driver 202 can drive a gate terminal of transistor HS1 using V_HS1 to switch on transistor HS1.

Comparators C2, C3 can each receive a voltage level measured across transistor LS2 as inputs. Comparator C2 can output a signal transistor LS2_ON and comparator C3 can output a signal transistor LS2_OFF. In one embodiment, each one of signal LS2_ON and LS2_OFF can have a respective voltage level representing a binary value (e.g., logic HIGH or LOW, or binary one or zero). LS2_ON and LS2_OFF may not have the same value or voltage level. In one embodiment, comparator C3 can be auto-calibrated to output LS2_OFF indicating a need to switch off transistor LS2 in response to a detection of zero current at node AC1. Controller 122 can be configured to input LS2_ON and LS2_OFF into finite state machine 204, and finite state machine 204 can output a state based on the voltage levels of signal LS2_ON and/or LS2_OFF. For example, if signal LS2_ON has a voltage level indicating to switch on LS2 and signal LS2_OFF has zero voltage (e.g., indicating no change), then finite state machine 204 can output a state that is based on the voltage level of signal LS2_ON. Controller 122, based on the state outputted by finite state machine 204 and based on a current state of transistors HS1, HS2, LS1, LS2, can determine which transistors among HS1, HS2, LS1, LS2 to selectively switch on, switch off, and maintain a current on or off state. In one embodiment, controller 122 can be configured to use signals LS2_ON and LS2_OFF under both FBR and VD modes. In response to determining to switch on transistor LS2, controller 122 can send a drive voltage V_LS2 to gate driver 202 and gate driver 202 can drive a gate terminal of transistor LS2 using V_LS2 to switch on transistor LS2. In response to determining to switch off transistor LS2, controller 122 can adjust a voltage level of V_LS2 to zero, or to a voltage below a threshold voltage of transistor LS2, and send the adjusted V_LS2 to gate driver 202 such that transistor LS2 can be switched off.

Comparators C4, C5 can each receive a voltage level measured across transistor LS1 as inputs. Comparator C4 can output a signal transistor LS1_ON and comparator C5 can output a signal transistor LS1_OFF. In one embodiment, each one of signal LS1_ON and LS1_OFF can have a respective voltage level representing a binary value (e.g., logic HIGH or LOW, or binary one or zero). LS1_ON and LS1_OFF may not have the same value or voltage level. In one embodiment, comparator C5 can be auto-calibrated to output LS1_OFF indicating a need to switch off transistor LS1 in response to a detection of zero current at node AC2. Controller 122 can be configured to input LS1_ON and LS1_OFF into finite state machine 204, and finite state machine 204 can output a state based on the voltage levels of signal LS1_ON and/or LS1_OFF. For example, if signal LS1_ON has a voltage level indicating to switch on LS1 and signal LS1_OFF has zero voltage (e.g., indicating no change), then finite state machine 204 can output a state that is based on the voltage level of signal LS1_ON. Controller 122, based on the state outputted by finite state machine 204 and based on a current state of transistors HS1, HS2, LS1, LS2, can determine which transistors among HS1, HS2, LS1, LS2 to selectively switch on, switch off, and maintain a current on or off state. In one embodiment, controller 122 can be configured to use signals LS1_ON and LS1_OFF under the FBR and VD modes. In response to determining to switch on transistor LS1, controller 122 can send a drive voltage V_LS1 to gate driver 202 and gate driver 202 can drive a gate terminal of transistor LS1 using V_LS1 to switch on transistor LS1. In response to determining to switch off transistor LS1, controller 122 can adjust a voltage level of V_LS1 to zero, or to a voltage below a threshold voltage of transistor LS1, and send the adjusted V_LS1 to gate driver 202 such that transistor LS1 can be switched off.

Comparator C6 can receive a voltage level of VRECT and an overvoltage threshold (OV_THR) as inputs, and output a signal VRECT_OV. The overvoltage threshold OV_THR can be a predetermined value or voltage level stored in a memory of controller 122. Controller 122 can be configured to read a value, or voltage level, of the signal VRECT_OV and based on the value, determine whether to enable a charge pump 210. Controller 122 can output a signal QP to charge pump 210, and charge pump 210 can be enabled or disabled based on a value or voltage level of signal QP. Charge pump 210, when enabled, can boost the voltage level VRECT during the power-up to a level that may be sufficient to start up system 100 (see FIG. 1). In one embodiment, signal QP can be a disable signal (or an enable negate signal) that disables charge pump 210. In one embodiment, charge pump 210 can be enabled when VRECT is zero, and controller 122 can disable charge pump 210 in response to VRECT reaching a specific voltage level. In one embodiment, a transistor 212, which can be a MOSFET, can be connected between charge pump 210 and transistor LS2 in order to short AC2 to ground (GND). In one embodiment, transistor 212 can have a smaller transistor size than transistor LS1.

In another embodiment, transistor 212 may be removed and charge pump 210 can be connected to a gate terminal of transistor LS1. Charge pump can generate a gate-source voltage based on voltage level at AC1 and VRECT, and the generated gate-source voltage can be sufficient to switch on transistor LS1. In one embodiment, in response to the voltage level at AC1 being in proximity to VRECT, charge pump 210 can generate the gate source voltage. The generated gate-source voltage can boost VRECT. In one embodiment, if system 100 starts up when receiver 120 is operating in VD mode, then the voltage induced on the coil RX may increase VRECT to a level higher than OV_THR, and controller 122 can disable charge pump 210 based on signal VRECT_OV indicating there may be an overvoltage protection.

Figure 3A:
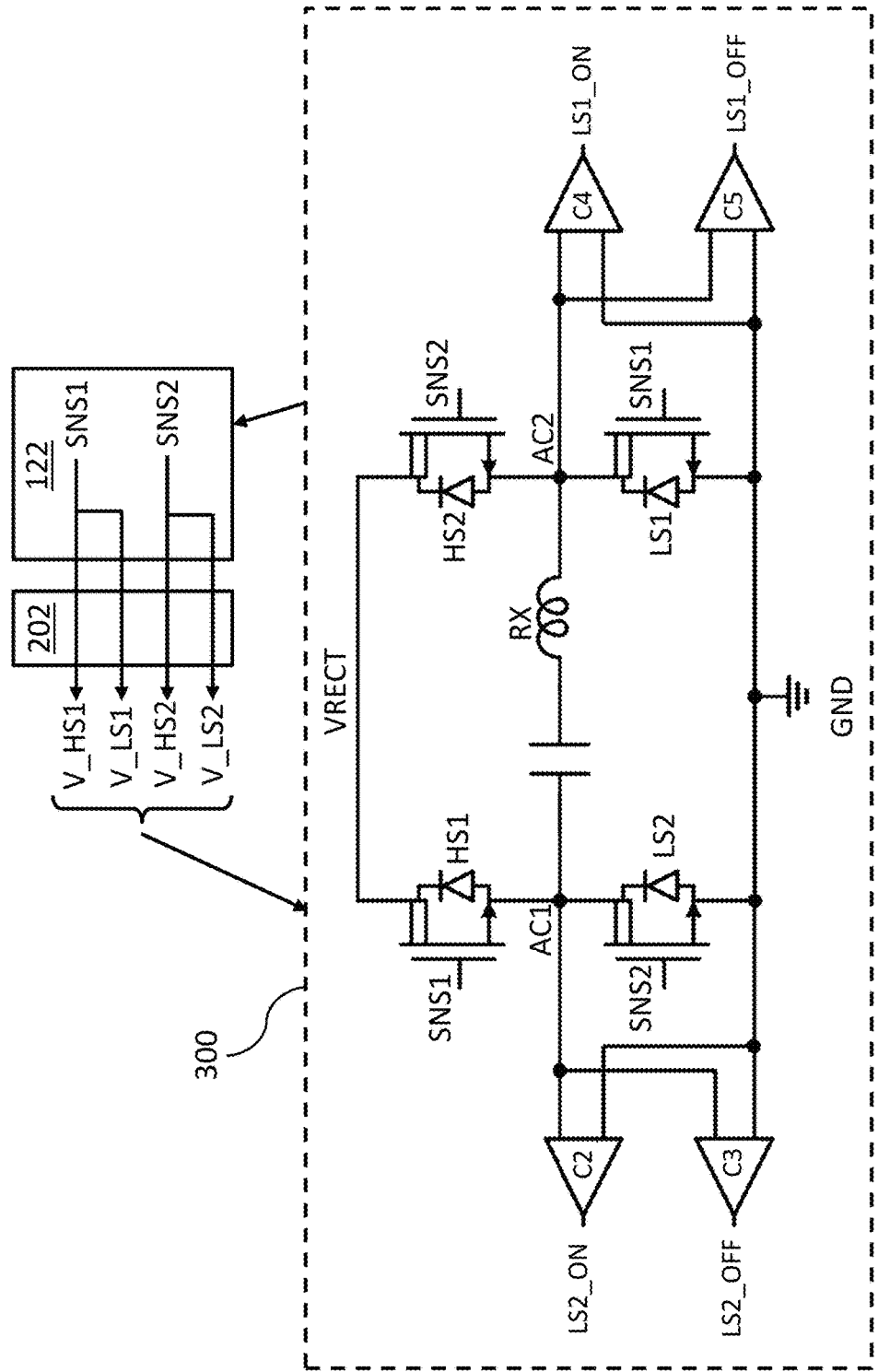
FIG. 3A is a diagram showing a circuit that can implement a full bridge rectifier mode in a wireless power receiver in one embodiment.

FIG. 3A is a diagram showing a circuit that can implement a full bridge rectifier mode in a wireless power receiver in one embodiment. A circuit 300 shown in FIG. 3A can include power rectifier 124 and comparators C2, C3, C4, C5. Under FBR mode, controller 122 can alternately switch the pair of transistors HS1, LS1 and the pair of transistors HS2, LS2. For instance, transistors HS1, LS1 can be switched on while transistors HS2, LS2 are switched off, and transistors HS1, LS1 can be switched off while transistors HS2, LS2 are switched on. In response to transistors HS1, LS1 being switched on, a current path can be formed from ground to VRECT and current can flow from AC2 to AC1. In response to transistors HS2, LS2 being switched on, a current path can be formed from ground to VRECT and current can flow from AC1 to AC2. Controller 122 can be configured to generate a drive signal SNS1 that can be used for switching on transistors HS1, LS1. Further, controller 122 can be configured to generate a drive signal SNS2 that can be used for switching on transistors HS2, LS2. Drive signals SNS1 and SNS2 can be nonoverlapping signals (e.g., will not have the same values or voltage levels). In one embodiment, under the FBR mode, controller 122 can output drive signal SNS1, as V_HS1 and V_LS1, to drive transistors HS1, LS1, via gate driver 202, using SNS1. Controller 122 can output drive signal SNS2, as V_HS2 and V_LS2, to drive transistors HS2, LS2, via gate driver 202, using SNS2.

Figure 3B:
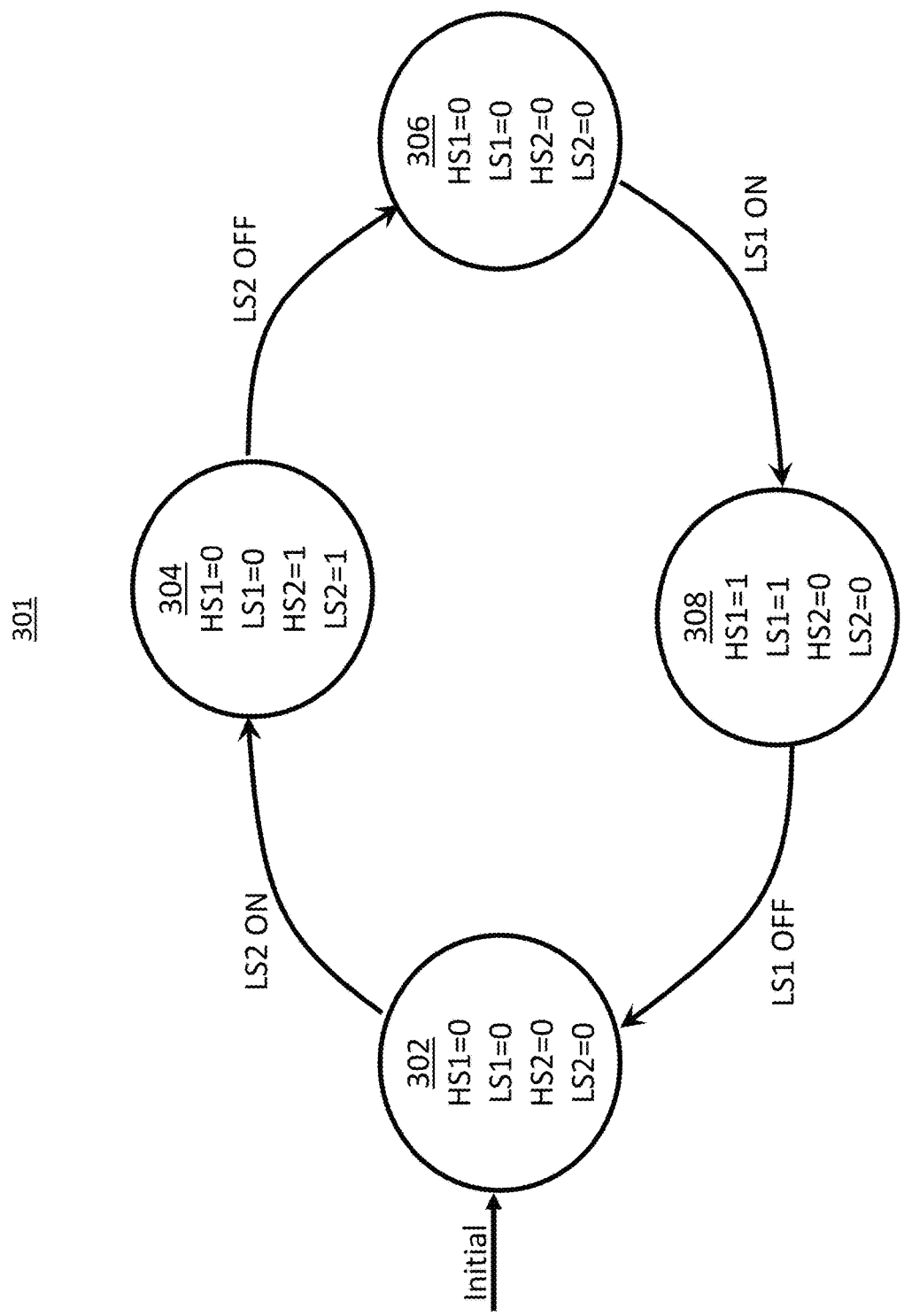
FIG. 3B is a state diagram of the full bridge rectifier mode of FIG. 3A in one embodiment.

FIG. 3B is a state diagram of the full bridge rectifier mode of FIG. 3A in one embodiment. A state diagram 301 of finite state machine 204 (see FIG. 2) is shown in FIG. 3B. State 302 can be an initial state of state diagram 301, where transistors HS1, HS2, LS1, LS2 are switched off (e.g., indicated as binary zero). In response to transistor LS2 being switched on for a predetermined amount of delay, state 302 can transition to state 304. At state 304, transistor HS2 can be switched on (e.g., indicated as binary one) along with transistor LS2, and transistors HS1, LS1 remains switched off. In response to transistor LS2 being switched off, state 304 can transition to state 306. At state 306, transistors HS1, HS2, LS1, LS2 can be switched off. In response to transistor LS1 being switched on, state 306 can transition to state 308. At state 308, transistor HS1 can be switched on along with transistor LS1, and transistors HS2, LS2 remains switched off. State 308 can return to state 302 in response to transistor LS1 being switched off. Finite state machine 204 can output one of states 302, 304, 306, 308 in response to receiving one of the outputs from a comparator in circuit 150 (see FIG. 2), and controller 122 can use the outputted state to selectively switch on and switch off one or more specific transistors among transistors HS1, HS2, LS1, LS2.

Figure 4A:
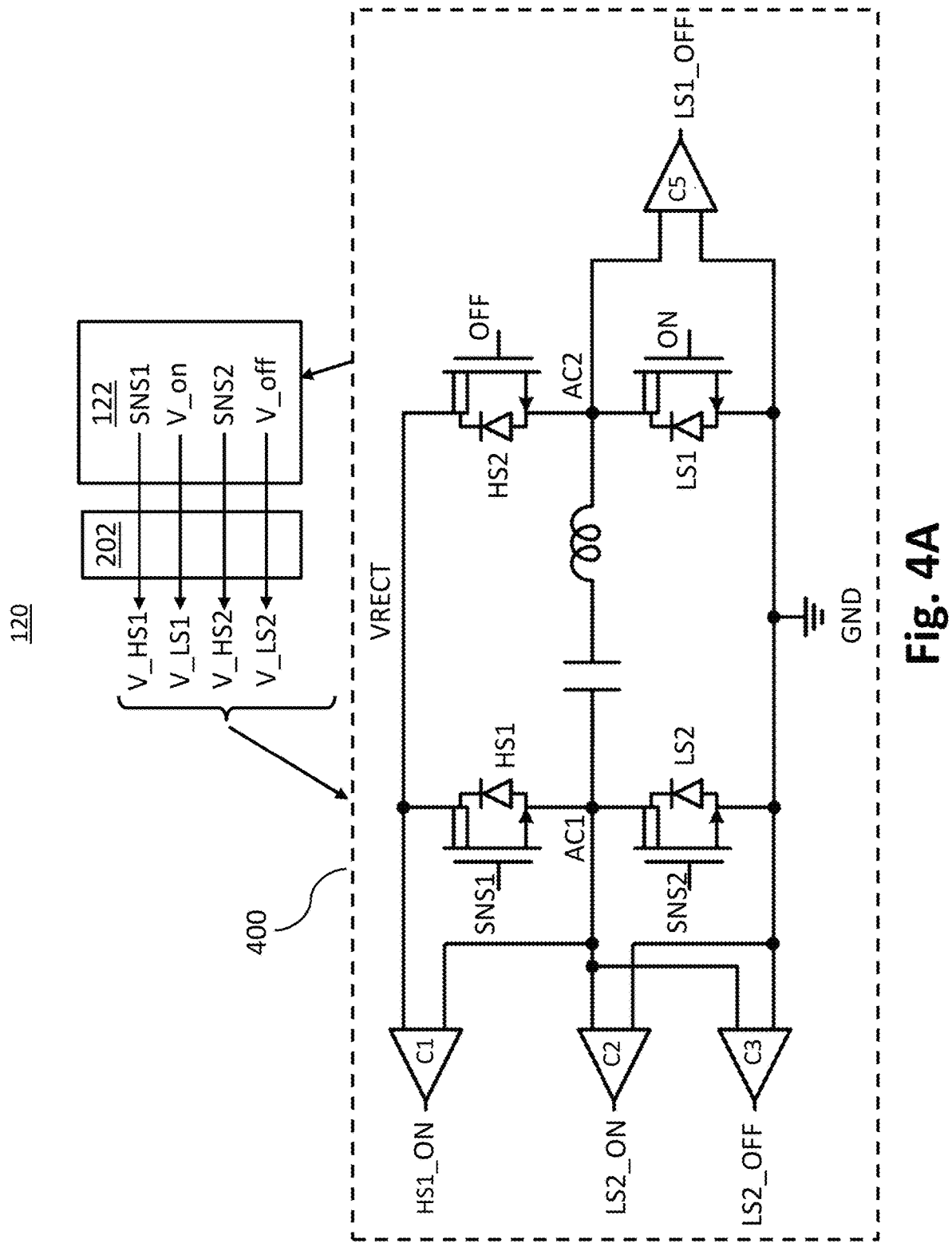
FIG. 4A is a diagram showing a circuit that can implement a voltage doubler mode in a wireless power receiver in one embodiment.

FIG. 4A is a diagram showing a circuit that can implement a voltage doubler mode in a wireless power receiver in one embodiment. A circuit 400 shown in FIG. 4A can include power rectifier 124 and comparators C1, C2, C3, C5. Under VD mode, transistor LS1 can remain switched on, transistor HS2 can remain switched off, and controller 122 can alternately switch transistors HS1, LS2. For example, in a first cycle, transistor LS1 and transistor HS1 (transistor LS2 will be off) can be switched on simultaneously to form a current path from ground to VRECT and current can flow from AC2 to AC1. In the first cycle, controller 122 can set SNS1 to a voltage level that can switch on transistor HS1. Further, in the first cycle, since transistor LS1 needs to remain switched on, controller 122 can output SNS1, as V_HS1, to drive transistor HS1 via gate driver 202, and can output another signal V_on, as V_LS1, to switch on transistor LS1. Signal V_on can have a constant voltage level that is sufficient to drive a gate terminal of transistor LS1 to switch on transistor LS1. In a second cycle, transistor LS1 and transistor LS2 can be switched on (transistor HS1 will be off) and node AC1 can be shorted to ground. Further, in the second cycle, since transistor HS2 needs to remain switched off, controller 122 can output SNS2, as V_LS2, to drive transistor LS2 via gate driver 202, and can output a signal V_off as V_HS2. Signal V_off can be zero volts (e.g., controller 122 may not apply any voltage to the signal trace for V_HS2) or a voltage that is below a threshold voltage of transistor HS2.

Figure 4B:
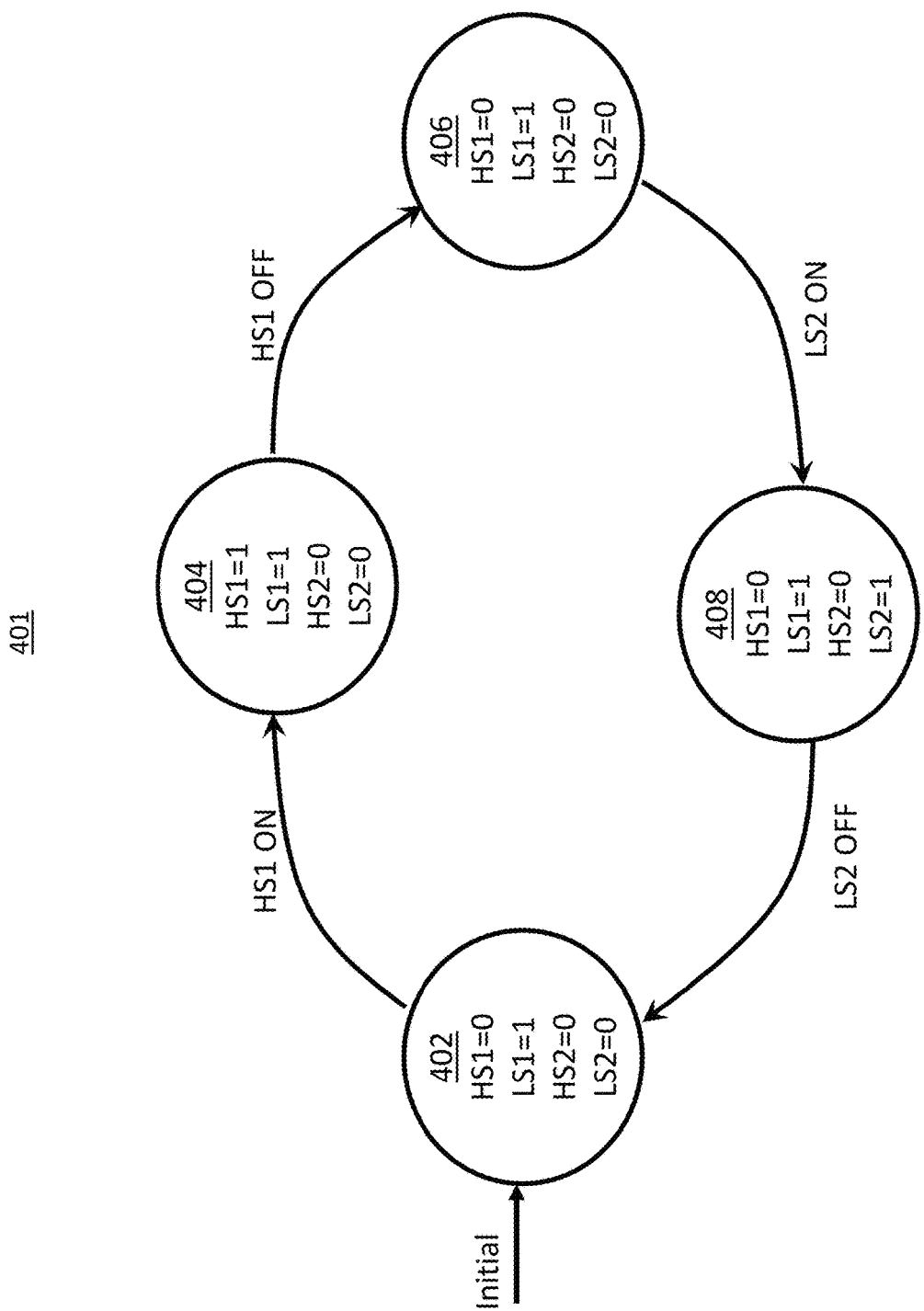
FIG. 4B is a state diagram of the voltage doubler mode of FIG. 4A in one embodiment.

FIG. 4B is a state diagram of a voltage doubler mode of FIG. 4A in one embodiment. A state diagram 401 of finite state machine 204 (see FIG. 2) is shown in FIG. 4B. State 402 can be an initial state of state diagram 401, where transistors HS1, HS2, transistor LS2 are switched off (e.g., indicated as binary zero) and transistor LS1 is switched on (e.g., indicated as binary one). In response to transistor HS1 being switched on for a predetermined amount of delay, state 402 can transition to state 404. At state 404, transistor HS1 can be switched on, transistor LS1 remains switched on, and transistors HS1, LS1 remains switched off. In response to transistor HS1 being switched off, state 404 can transition to state 406. At state 406, transistor HS1 can be switched off, transistor LS1 remains switched on, and transistors HS1, LS1 remains switched off. In response to transistor LS2 being switched on, state 406 can transition to state 408. At state 408, transistor LS2 can be switched on along with transistor LS1, and transistors HS1, HS2 remains switched off. State 408 can return to state 402 in response to transistor LS2 being switched off. Finite state machine 204 can output one of states 402, 404, 406, 408 in response to receiving one of the outputs from a comparator in circuit 150 (see FIG. 2), and controller 122 can use the outputted state to selectively switch on and switch off one or more specific transistors among transistors HS1, HS2, LS1, LS2

Figure 5A:
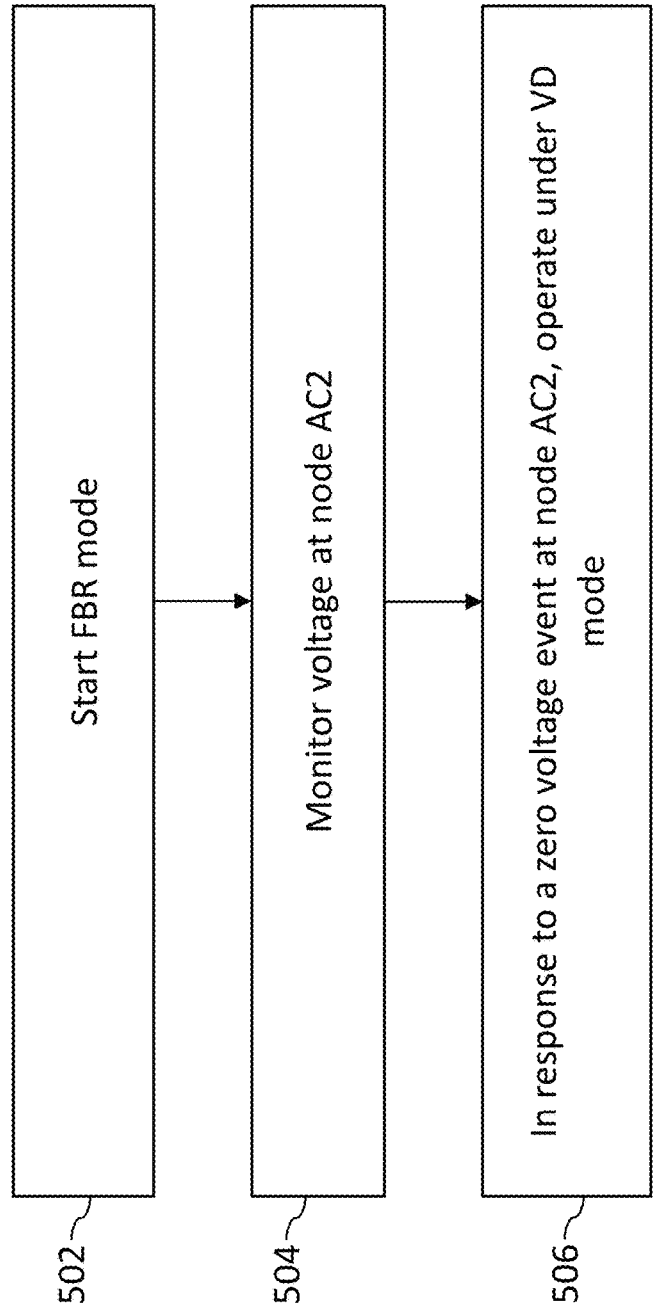
FIG. 5A is a flow diagram illustrating a process of switching from a full bridge rectifier mode to a voltage doubler mode in one embodiment.

FIG. 5A is a flow diagram illustrating a process 500 of switching from a full bridge rectifier mode to a voltage doubler mode in one embodiment. The process 500 may include one or more operations, actions, or functions as illustrated by one or more of blocks 502, 504, and/or 506. Although illustrated as discrete blocks, various blocks can be divided into additional blocks, combined into fewer blocks, eliminated, or performed in parallel, and/or performed in different order, depending on the desired implementation. Descriptions of process 500 can refer to components of FIG. 1-4.

Process 500 can start at block 502, wherein a wireless power receiver (e.g., receiver 120) can operate under a full bridge rectifier mode. Process 500 can proceed from block 502 to block 504. At block 504, a controller (e.g., controller 122) of the wireless power receiver can monitor a voltage level at the node AC2. Process 500 can proceed from block 504 to block 506. At block 506, the controller can switch operation of the wireless power receiver in response to a detection of a rising edge of signal LS1_ON. The rising edge of signal LS1_ON can indicate that a voltage at node AC2 is zero (or AC2 is pulled to ground). Using the detection of the rising edge of signal LS1_ON to trigger a mode switch from FBR mode to VD mode can ensure a zero-voltage switching that provides digital synchronization across the transistors HS1, HS2, LS1, LS2. For example, the switching from FBR mode to VD mode in response to the rising edge of signal LS1_ON can ensure that transistor HS2 is being switched off during the mode switch since the VD mode requires transistor HS2 to remain switched off. Hence, HS2 will not be accidentally switched on after the mode switch from FBR mode to VD mode.

Figure 5B:
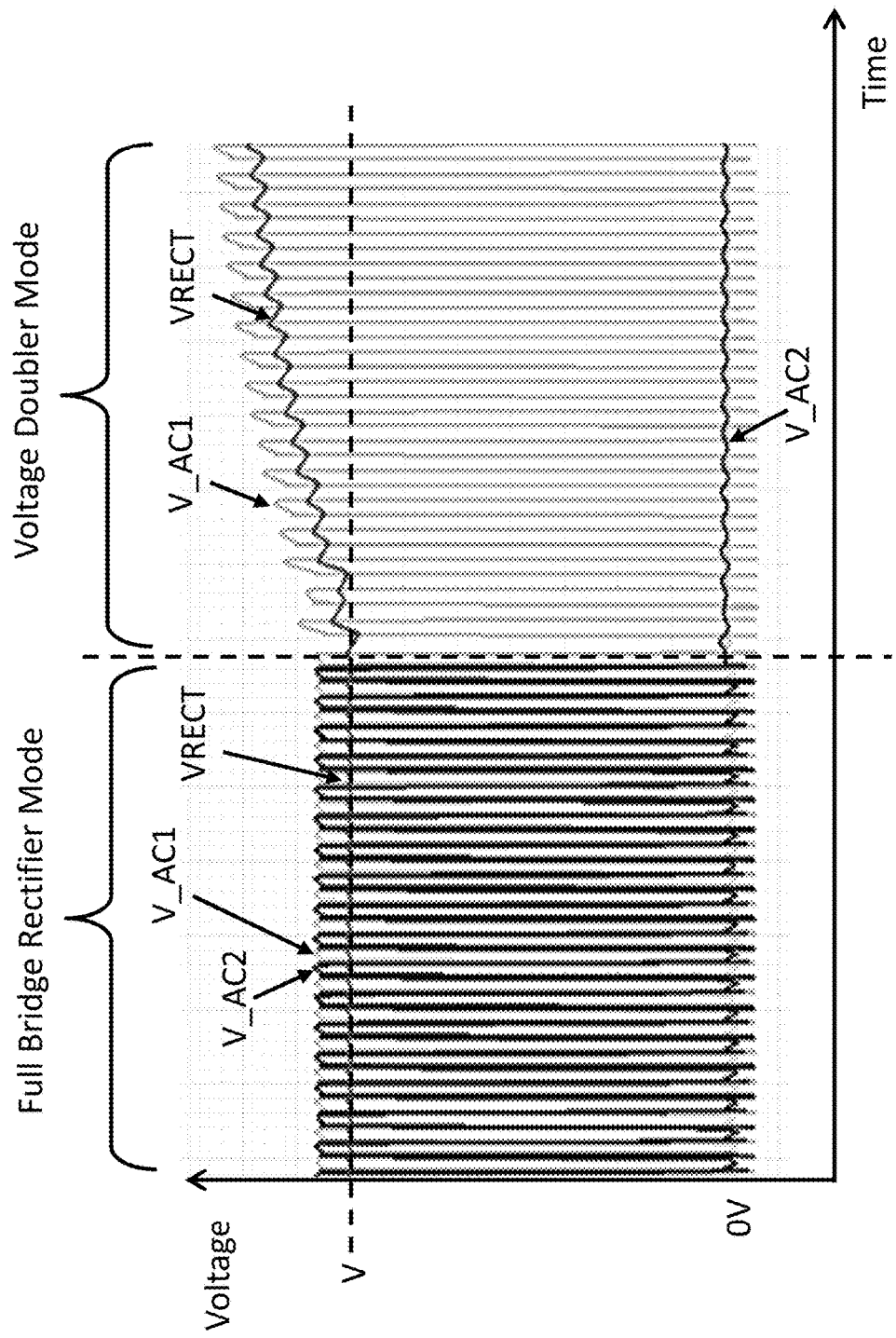
FIG. 5B is a diagram illustrating voltage level changes in response to a mode switch from a full bridge rectifier mode to a voltage doubler mode in one embodiment.

FIG. 5B is a diagram illustrating voltage level changes in response to a mode switch from a full bridge rectifier mode to a voltage doubler mode in one embodiment. In the diagram shown in FIG. 5B, during FBR mode, the voltage at node AC1 (V_AC1) and the voltage at node AC2 (V_AC2) can vary alternately and VRECT can be maintained at a voltage level V. In response to switching from FBR mode to VD mode, VRECT can be increased to voltage levels greater than V. Hence, VD mode can be used for increasing VRECT.

Figure 6A:
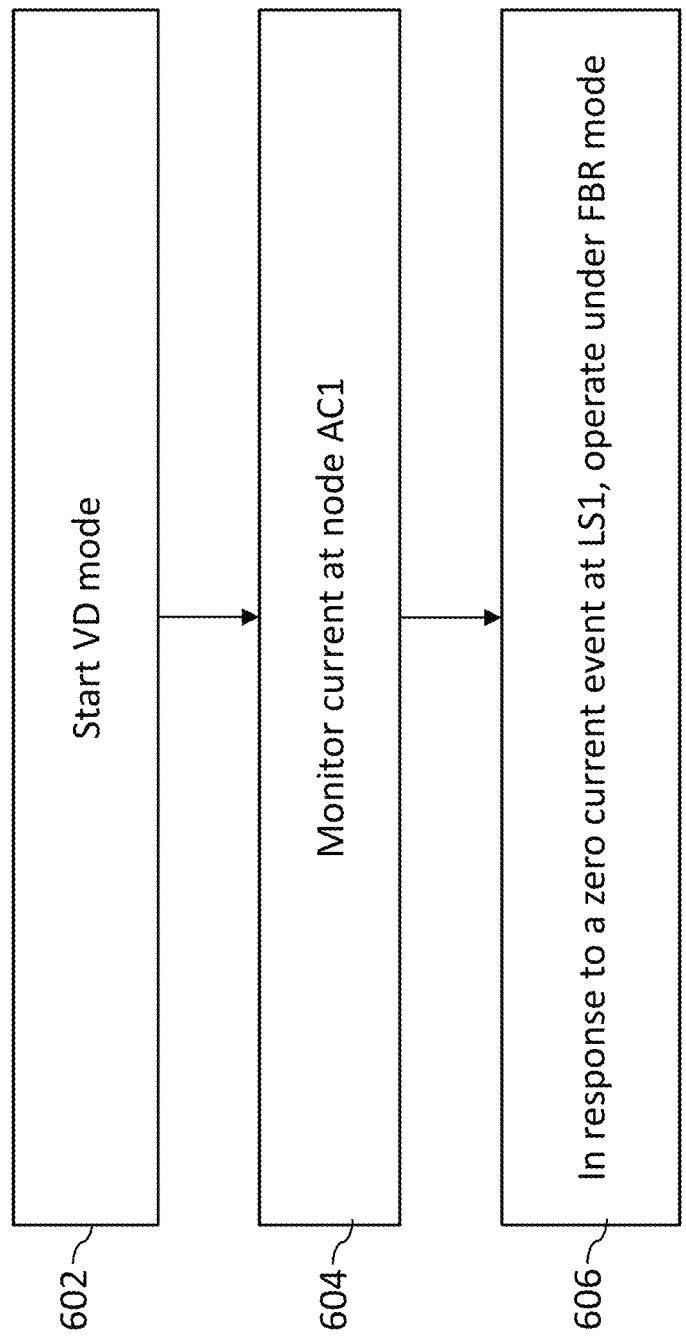
FIG. 6A is a flow diagram illustrating a process of switching from a voltage doubler mode to a full bridge rectifier mode in one embodiment.

FIG. 6A is a flow diagram illustrating a process 600 of switching from a voltage doubler mode to a full bridge rectifier mode in one embodiment. The process 600 may include one or more operations, actions, or functions as illustrated by one or more of blocks 602, 604, and/or 606. Although illustrated as discrete blocks, various blocks can be divided into additional blocks, combined into fewer blocks, eliminated, or performed in parallel, and/or performed in different order, depending on the desired implementation. Descriptions of process 600 can refer to components of FIGS. 1-4.

Process 600 can start at block 602, wherein a wireless power receiver (e.g., receiver 120) can operate under a voltage doubler mode. Process 600 can proceed from block 602 to block 604. At block 604, a controller (e.g., controller 122) of the wireless power receiver can monitor a current flowing through transistor LS1. Process 600 can proceed from block 604 to block 606. At block 606, the controller can switch operation of the wireless power receiver in response to a detection of a rising edge of signal LS1_OFF. The rising edge of signal LS1_OFF can indicate zero current at transistor LS1. Using the detection of the rising edge of LS1_OFF to trigger a mode switch from VD mode to FBR mode can ensure a zero-current switching that provides digital synchronization across the transistors HS1, HS2, LS1, LS2. The switching from VD mode to FBR mode in response to the rising edge of signal LS1_OFF can ensure that nodes AC1 and AC2 are complementary (e.g., their voltage levels are opposite, either 0V or VRECT, from the switching point).

Figure 6B:
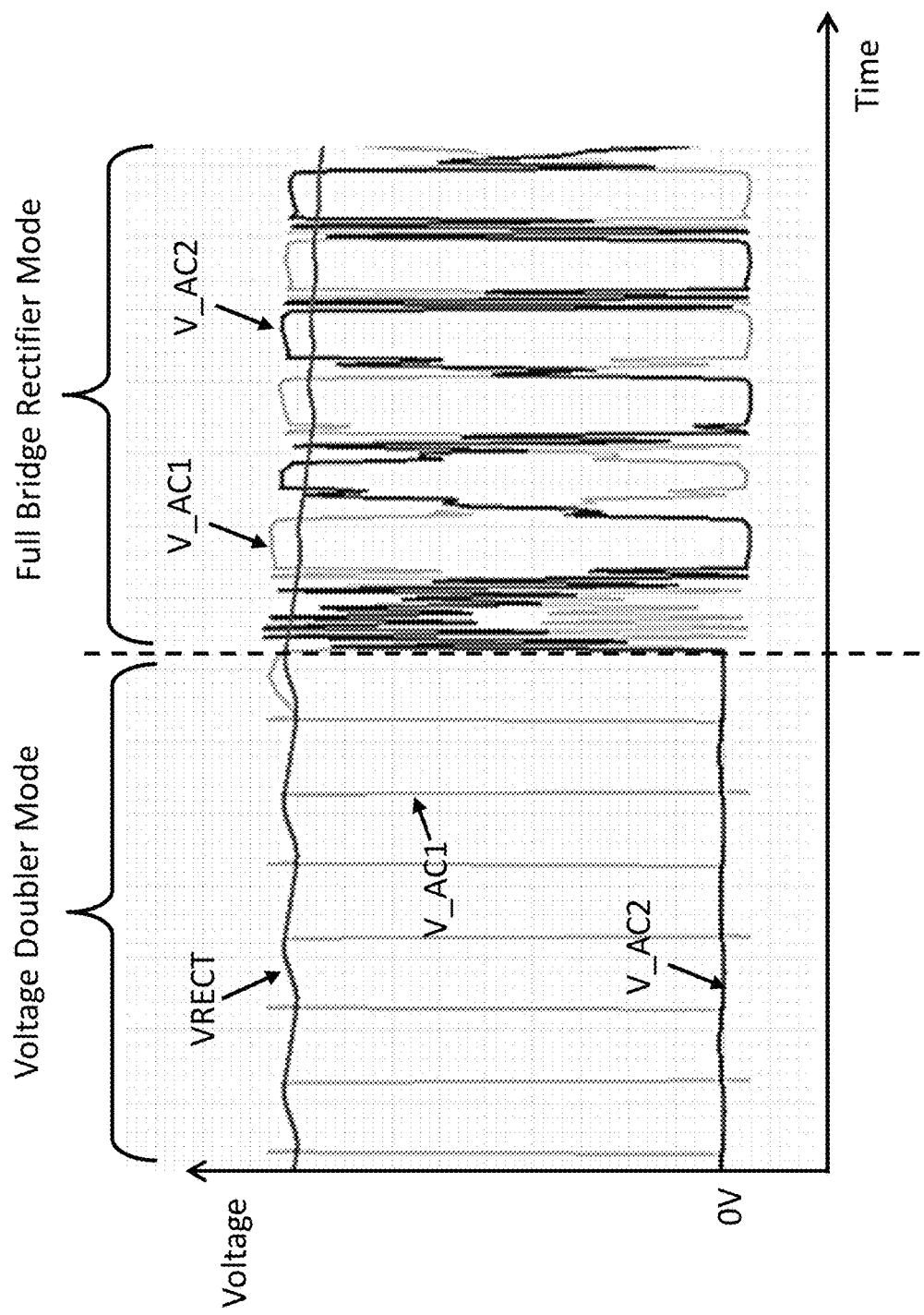
FIG. 6B is a diagram illustrating voltage level changes in response to a mode switch from a voltage doubler mode to a full bridge rectifier mode in one embodiment.

FIG. 6B is a diagram illustrating voltage level changes in response to a mode switch from a voltage doubler mode to a full bridge rectifier mode in one embodiment. In the diagram shown in FIG. 6B, during VD mode, the voltage at node AC1 (V_AC1) can vary periodically in response to alternately switching on transistors HS1 and LS2 while V_AC2 remains at 0V (e.g., since HS2 is switched off in VD mode). In response to switching from VD mode to FBR mode, VRECT can be decreased to a steady state voltage level and voltages V_AC1 and V_AC2 can vary alternately.

Figure 7A:
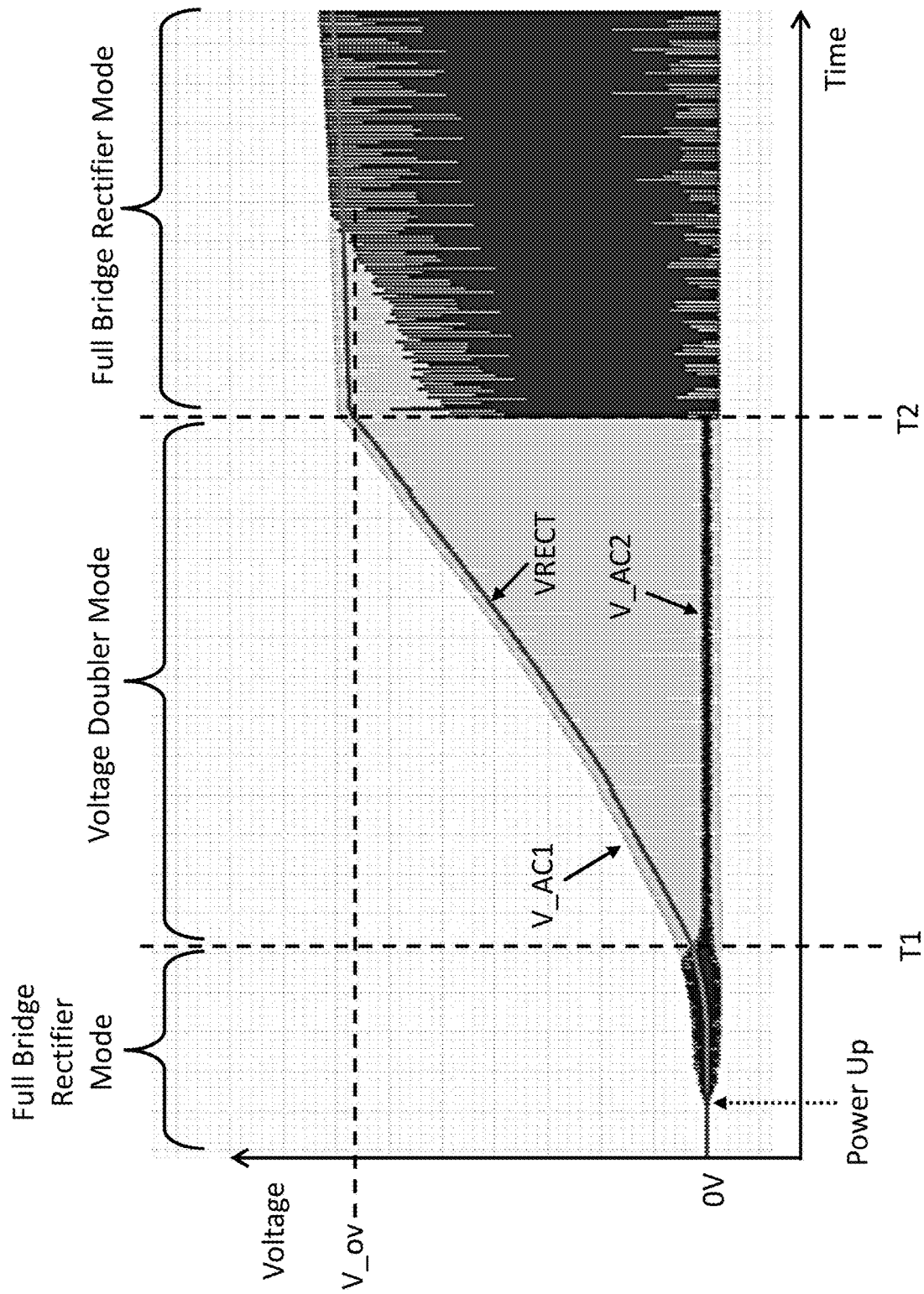
FIG. 7A is a diagram showing a transition into a full bridge rectifier mode for overvoltage protection in one embodiment.

FIG. 7A is a diagram showing a transition into a full bridge rectifier mode for overvoltage protection in one embodiment. In one embodiment, during start up or power up of receiver 120 (see FIG. 1), VRECT can start at zero volts. VRECT may need to reach a minimum voltage in order to power up receiver 120. In the example shown in FIG. 7, if receiver 120 starts power up under the FBR mode, the voltages V_AC1 and V_AC2 increases VRECT at a relatively slow pace. The charge pump 210 is able to produce sufficient gate-source voltage (VGS) to turn on 212 at a time T1 to switch from FBR mode to VD mode. In response to the mode switch at T1, V_AC2 can remain at zero volts but V_AC1 can increase at a relatively higher pace, effectively increasing VRECT as well. The VD mode can increase VRECT relatively faster than FBR mode, hence decreasing a power up time of receiver 120.

Figure 7B:
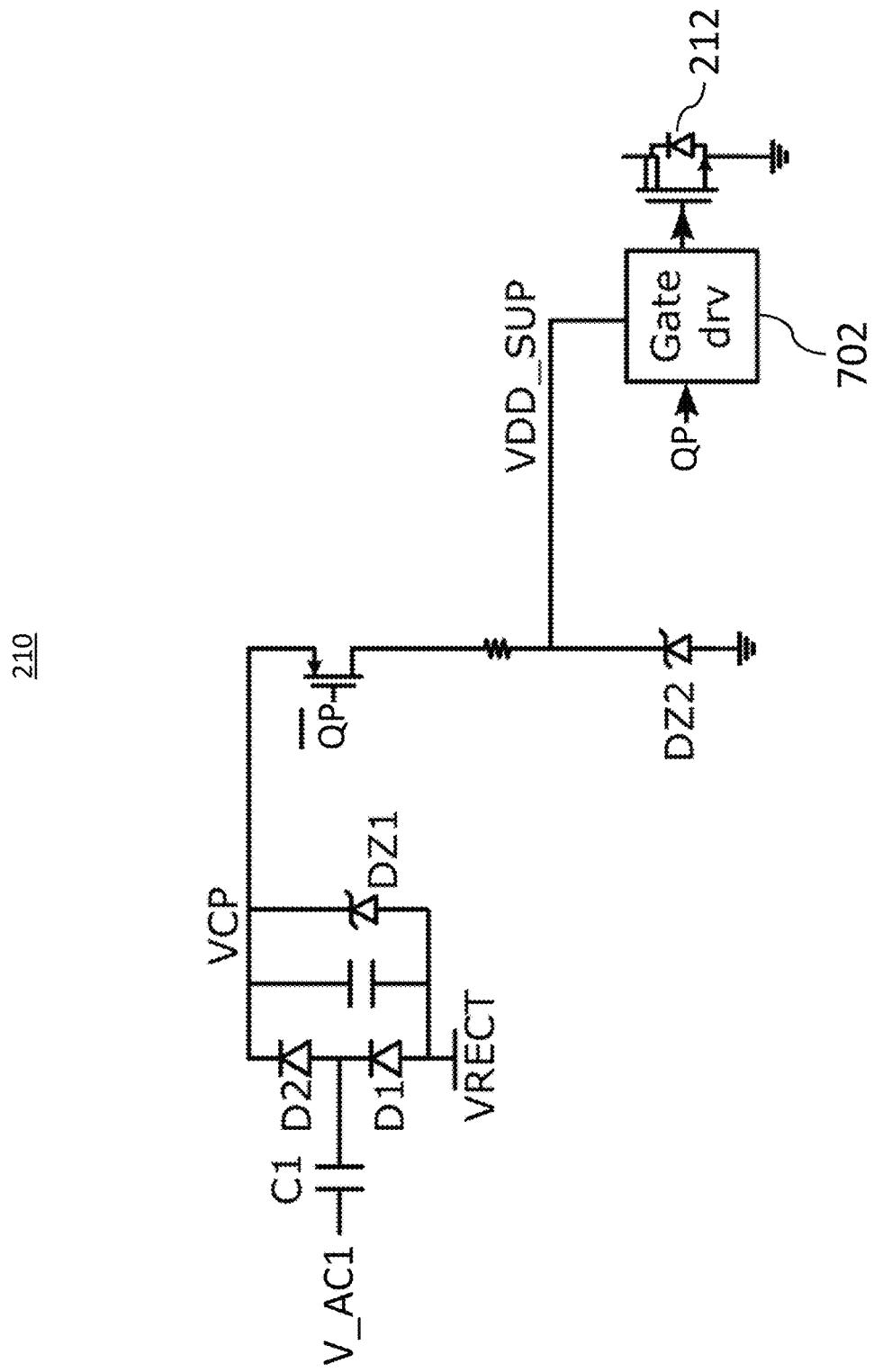
FIG. 7B is a diagram showing details of a charge pump that can be implemented in a voltage doubler mode in one embodiment.

FIG. 7B is a diagram showing details of a charge pump that can be implemented in a voltage doubler mode in one embodiment. In the example shown in FIG. 7B, charge pump 210 can receive the voltage V_AC1, VRECT, and a signal QP as inputs. Referring to FIG. 7A, as receiver 120 powers up, V_AC1 and VRECT can increase gradually. As V_AC1 and VRECT increase to nonzero voltage levels (e.g., 1V, 1.5V, or other predefined voltage thresholds), controller 122 (see FIG. 2) can enable charge pump 210. In response to receiving signal QP, a gate driver 702 in charge pump 210 can switch on transistor 212 to short node AC2 to ground in order to operate receiver 120 in VD mode. In embodiments where transistor 212 is installed in the receiver 120, the output of gate driver 702 can be connected to a gate terminal of LS1 and gate driver 702 can switch on LS1 to short node AC2 to ground. If VRECT increases to a voltage level greater than the overvoltage threshold OV_THR (see FIG. 2), then controller 122 can disable charge pump 210 by setting signal QP to a disable value (e.g., binary zero or one, depending on charge pump 210). In response to charge pump being disabled, receiver 120 can operate under FBR mode, or under VD mode that is not being trigger by charge pump 210.

Figure 8:
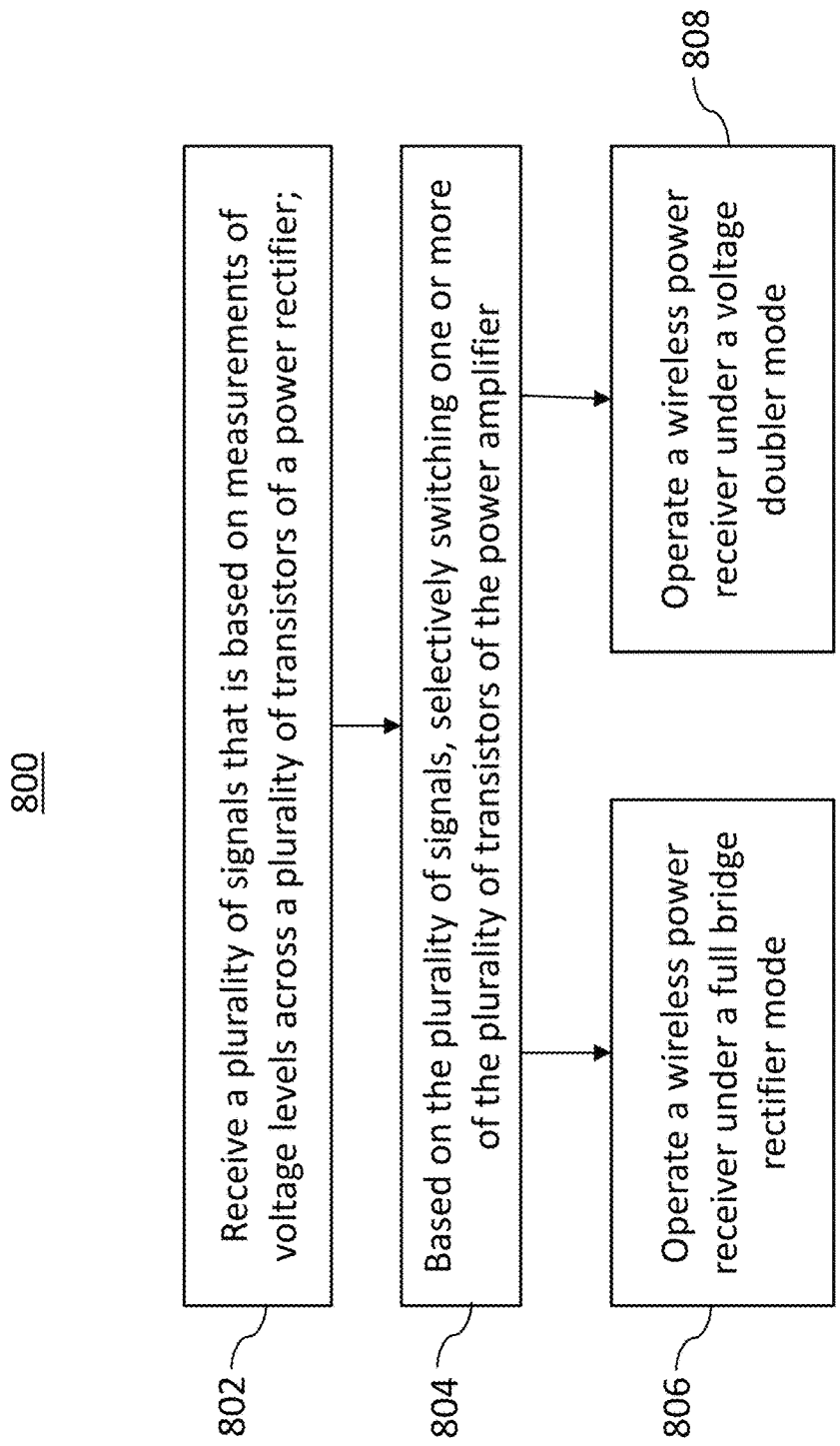
FIG. 8 is a flow diagram illustrating a process of implementing full bridge rectifier and voltage doubler in wireless power application in one embodiment.

FIG. 8 is a flow diagram illustrating a process of implementing full bridge rectifier and voltage doubler in wireless power application in one embodiment. The process 800 may include one or more operations, actions, or functions as illustrated by one or more of blocks 802, 804, 806 and/or 808. Although illustrated as discrete blocks, various blocks can be divided into additional blocks, combined into fewer blocks, eliminated, or performed in parallel, and/or performed in different order, depending on the desired implementation.

Process 800 can be performed by a controller (e.g., controller 122 described herein) of a wireless power receiver (e.g., receiver 120 described herein). Process 800 can begin at block 802. At block 802, the controller can receive a plurality of signals that is based on measurements of voltage levels across a plurality of transistors of a power rectifier. In one embodiment, the controller can receive the plurality of signals from a plurality of comparators. The plurality of signals can be based on measurements of voltage levels across a first high side transistor, a second high side transistor, a first low side transistor, and a second low side transistor of the power rectifier.

Process 800 can proceed from block 802 to block 804. At block 804, the controller can, based on the plurality of signals, selectively switching one or more of the plurality of transistors of the power amplifier. In one embodiment, the controller can selectively switch one or more of the first high side transistor, the second high side transistor, the first low side transistor, and the second low side transistor of the power rectifier. In one embodiment, the controller can input the plurality of signals to a finite state machine. The controller can, based on an output of the finite state machine, selectively switch on one or more of the first high side transistor, the second high side transistor, the first low side transistor, and the second low side transistor.

Process 800 can proceed from block 804 to either one of block 806 or block 808, depending on the transistors being switched on at block 804. At block 806, the controller can operate the wireless power receiver under a full bridge rectifier mode. At block 808, the controller can operate a wireless power receiver under a voltage doubler mode. In one embodiment, the controller can enable the voltage doubler mode to power up the wireless power receiver. In one embodiment, the controller can enable the voltage doubler mode by enabling a charge pump to short a node between the second high side transistor and the first low side transistor to ground. In one embodiment, the transistor being switched on by the charge pump can be the first low side transistor.

In one embodiment, the controller can switch an operation mode of the wireless power receiver from the full bridge rectifier mode to the voltage doubler mode in response to a detection of a zero voltage event at a node between the second high side transistor and the first low side transistor, and in response to an indication to switch on the first low side transistor. In one embodiment, the controller can switch the operation mode of the wireless power receiver from the voltage doubler mode to the full bridge rectifier mode in response to a detection of a zero current event at a node between the first high side transistor and the second low side transistor, and in response to an indication to switch off the first low side transistor.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A semiconductor device for wireless power receiver comprising:
    a power rectifier configured to rectify alternating current (AC) power into direct current (DC) power, the power rectifier including a first high side transistor, a second high side transistor, a first low side transistor, and a second low side transistor;
    a plurality of comparators configured to:
        measure voltage levels across the first high side transistor, the second high side transistor, the first low side transistor, and the second low side transistor of the power rectifier; and
        output a plurality of signals; and
    a controller coupled to the power rectifier and the plurality of comparators, the controller being configured to, based on the plurality of signals outputted by the plurality of comparators, selectively switch on one or more of the first high side transistor, the second high side transistor, the first low side transistor, and the second low side transistor to operate a wireless power receiver under one of:
        a full bridge rectifier mode; and
        a voltage doubler mode.

2. The semiconductor device of claim 1, wherein under the voltage doubler mode, the controller is configured to:
    switch off the second high side transistor;
    switch on the first low side transistor; and
    alternately switch on the first high side transistor and the second low side transistor.

3. The semiconductor device of claim 1,
    wherein the controller is configured to:
        input the plurality of signals to a finite state machine; and
        based on an output of the finite state machine, selectively switch on one or more of the first high side transistor, the second high side transistor, the first low side transistor, and the second low side transistor.

4. The semiconductor device of claim 1, wherein the controller is configured switch an operation mode of the wireless power receiver from the full bridge rectifier mode to the voltage doubler mode in response to:
    a detection of a zero voltage event at a node between the second high side transistor and the first low side transistor.

5. The semiconductor device of claim 1, wherein the controller is configured to switch an operation mode of the wireless power receiver from the voltage doubler mode to the full bridge rectifier mode in response to:
    a detection of a zero current event at a comparator connected to ground and connected to a node between the first high side transistor and the second low side transistor.

6. The semiconductor device of claim 1, wherein the controller is configured to power up the wireless power receiver by enabling the voltage doubler mode.

7. The semiconductor device of claim 6, wherein the controller is configured to enable the voltage doubler mode by enabling a charge pump, and the charge pump is configured to switch on a transistor to short a node between the second high side transistor and the first low side transistor to ground.

8. The semiconductor device of claim 7, wherein the transistor being switched on by the charge pump is the first low side transistor.

9. An apparatus comprising:
a plurality of comparators configured to:
measure voltage levels across a first high side transistor, a second high side transistor, a first low side transistor, and a second low side transistor of a power rectifier; and
output a plurality of signals; and
a controller coupled to the power rectifier and the plurality of comparators, the controller being configured to, based on the plurality of signals outputted by the plurality of comparators, selectively switch on one or more of the first high side transistor, the second high side transistor, the first low side transistor, and the second low side transistor to operate a wireless power receiver under one of:
a full bridge rectifier mode; and
a voltage doubler mode.

10. The apparatus of claim 9, wherein the controller is configured to power up the wireless power receiver by enabling the voltage doubler mode.

11. The apparatus of claim 10, further comprising a charge pump, wherein the controller is configured to enable the voltage doubler mode by enabling the charge pump to switch on a transistor to short a node between the second high side transistor and the first low side transistor to ground.

12. The apparatus of claim 11, wherein the transistor being switched on by the charge pump is the first low side transistor.

13. The apparatus of claim 9, wherein under the voltage doubler mode, the controller is configured to:
switch off the second high side transistor;
switch on the first low side transistor; and
alternately switch on the first high side transistor and the second low side transistor.

14. The apparatus of claim 9, wherein the controller is configured to:
input the plurality of signals to a finite state machine; and
based on an output of the finite state machine, selectively switch on one or more of the first high side transistor, the second high side transistor, the first low side transistor, and the second low side transistor.

15. The apparatus of claim 9, wherein the controller is configured switch an operation mode of the wireless power receiver from the full bridge rectifier mode to the voltage doubler mode in response to:
a detection of a zero voltage event at a node between the second high side transistor and the first low side transistor.

16. The apparatus of claim 9, wherein the controller is configured switch an operation mode of the wireless power receiver from the voltage doubler mode to the full bridge rectifier mode in response to:
a detection of a zero current event at a comparator connected to ground and connected to a node between the first high side transistor and the second low side transistor.

17. A method for operating a wireless power receiver, the method comprising:
receiving, by a controller, a plurality of signals from a plurality of comparators, wherein the plurality of signals is based on measurements of voltage levels across a first high side transistor, a second high side transistor, a first low side transistor, and a second low side transistor of a power rectifier; and
based on the plurality of signals, selectively switching, by the controller, one or more of the first high side transistor, the second high side transistor, the first low side transistor, and the second low side transistor to operate a wireless power receiver under one of:
a full bridge rectifier mode; and
a voltage doubler mode.

18. The method of claim 17, further comprising enabling the voltage doubler mode to power up the wireless power receiver.

19. The method of claim 18, wherein enabling the voltage doubler mode comprises enabling a charge pump to short a node between the second high side transistor and the first low side transistor to ground.

20. The method of claim 17, further comprising:
switching, by the controller, an operation mode of the wireless power receiver from the full bridge rectifier mode to the voltage doubler mode in response to:
a detection of a zero voltage event at a node between the second high side transistor and the first low side transistor; and
switching, by the controller, the operation mode of the wireless power receiver from the voltage doubler mode to the full bridge rectifier mode in response to:
a detection of a zero current event at a comparator connected to ground and connected to a node between the first high side transistor and the second low side transistor.

* * * * *